(12) United States Patent
Gupta

(10) Patent No.: US 10,822,536 B2
(45) Date of Patent: Nov. 3, 2020

(54) METHOD OF USING A SCREEN CONTAINING A COMPOSITE FOR RELEASE OF WELL TREATMENT AGENT INTO A WELL

(71) Applicant: D.V. Satyanarayana Gupta, The Woodlands, TX (US)

(72) Inventor: D.V. Satyanarayana Gupta, The Woodlands, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 0 days.

(21) Appl. No.: 15/436,464

(22) Filed: Feb. 17, 2017

(65) Prior Publication Data

US 2017/0226404 A1    Aug. 10, 2017

(51) Int. Cl.
*C09K 8/524* (2006.01)
*C09K 8/80* (2006.01)
(Continued)

(52) U.S. Cl.
CPC .............. *C09K 8/524* (2013.01); *C01F 7/021* (2013.01); *C01F 7/30* (2013.01); *C01F 7/36* (2013.01); *C01F 7/441* (2013.01); *C04B 38/009* (2013.01); *C04B 40/0641* (2013.01); *C09C 1/407* (2013.01); *C09K 8/528* (2013.01); *C09K 8/536* (2013.01); *C09K 8/62* (2013.01); *C09K 8/72* (2013.01); *C09K 8/80* (2013.01); *E21B 37/06* (2013.01); *E21B 41/02* (2013.01); *E21B 43/084* (2013.01); *E21B 43/088* (2013.01); *E21B 43/25* (2013.01); *E21B 43/26* (2013.01); *E21B 43/267* (2013.01); *C01P 2004/32* (2013.01); *C01P 2004/60* (2013.01); *C01P 2006/12* (2013.01);
(Continued)

(58) Field of Classification Search
None
See application file for complete search history.

(56) References Cited

U.S. PATENT DOCUMENTS

| 1,570,537 A | 1/1926 | Teitsworth |
| 2,378,155 A | 6/1945 | Newsome |

(Continued)

FOREIGN PATENT DOCUMENTS

| CA | 1262507 | 10/1989 |
| EP | 0540204 A2 | 5/1993 |

(Continued)

OTHER PUBLICATIONS

P.J.C. Webb AEA Technology PLC, T.A., et al; Revolutionary New Chemical Delivery System for Fractured, Gravel Packed and Prepacked Screen Wells; SPE 38164; 1997.
(Continued)

*Primary Examiner* — John J Figueroa
(74) *Attorney, Agent, or Firm* — John Wilson Jones; Jones Delflache LLP

(57) ABSTRACT

The rate of release of a well treatment agent into a well may be controlled by introducing into the well a screen containing a well treatment composite having a well treatment agent and a support for the well treatment agent. The diameter of the substrate is less than the diameter of the opening of the screen of the screen assembly. Over time, the well treatment agent is released from the substrate and passes from the interior of the screen into the well.

17 Claims, 7 Drawing Sheets

(51) Int. Cl.

| | |
|---|---|
| *C09K 8/528* | (2006.01) |
| *C09K 8/62* | (2006.01) |
| *C09K 8/72* | (2006.01) |
| *E21B 37/06* | (2006.01) |
| *E21B 41/02* | (2006.01) |
| *E21B 43/08* | (2006.01) |
| *E21B 43/267* | (2006.01) |
| *E21B 43/26* | (2006.01) |
| *E21B 43/25* | (2006.01) |
| *C09C 1/40* | (2006.01) |
| *C04B 38/00* | (2006.01) |
| *C01F 7/02* | (2006.01) |
| *C01F 7/44* | (2006.01) |
| *C04B 40/06* | (2006.01) |
| *C01F 7/30* | (2006.01) |
| *C01F 7/36* | (2006.01) |
| *C09K 8/536* | (2006.01) |
| *C09K 8/60* | (2006.01) |

(52) U.S. Cl.
CPC ............ *C01P 2006/14* (2013.01); *C09K 8/60* (2013.01); *C09K 2208/32* (2013.01)

(56) References Cited

U.S. PATENT DOCUMENTS

| | | | |
|---|---|---|---|
| 3,179,170 A | 4/1965 | Burtch et al. | |
| 3,283,817 A | 11/1966 | Roberts | |
| 3,782,469 A | 1/1974 | Fulford | |
| 3,850,248 A | 11/1974 | Carney | |
| 3,913,675 A * | 10/1975 | Smyrl | E21B 43/04 166/278 |
| 4,013,587 A | 3/1977 | Fischer et al. | |
| 4,108,779 A | 8/1978 | Carney | |
| 4,109,721 A | 8/1978 | Slusser | |
| 4,352,741 A | 10/1982 | Wernau | |
| 4,390,456 A | 6/1983 | Sanchez et al. | |
| 4,552,591 A | 11/1985 | Millar | |
| 4,582,131 A | 4/1986 | Plummer et al. | |
| 4,660,645 A | 4/1987 | Newlove et al. | |
| 4,670,166 A | 6/1987 | McDougall et al. | |
| 4,738,897 A | 4/1988 | McDougall et al. | |
| 4,905,762 A | 3/1990 | Zilch | |
| 4,986,353 A | 1/1991 | Clark et al. | |
| 5,073,276 A | 12/1991 | Newlove et al. | |
| 5,102,558 A | 4/1992 | McDougall et al. | |
| 5,187,011 A | 2/1993 | Manalastas et al. | |
| 5,224,543 A | 7/1993 | Watkins et al. | |
| 5,225,123 A | 7/1993 | Torobin | |
| 5,373,899 A * | 12/1994 | Dore' | E21B 43/04 166/278 |
| 5,741,758 A | 4/1998 | Pakulski | |
| 5,758,725 A | 6/1998 | Streetman | |
| 5,893,416 A | 4/1999 | Read | |
| 5,922,652 A | 7/1999 | Kowalski et al. | |
| 5,964,291 A | 10/1999 | Bourne et al. | |
| 6,025,302 A | 2/2000 | Pakulski | |
| 6,209,643 B1 | 4/2001 | Nguyen et al. | |
| 6,209,646 B1 | 4/2001 | Reddy et al. | |
| 6,279,656 B1 | 8/2001 | Sinclair et al. | |
| 6,326,335 B1 | 12/2001 | Kowalski et al. | |
| 6,331,508 B1 | 12/2001 | Pakulski | |
| 6,380,136 B1 | 4/2002 | Bates et al. | |
| 6,439,310 B1 | 8/2002 | Scott, III et al. | |
| 6,527,051 B1 | 3/2003 | Reddy et al. | |
| 6,613,899 B1 | 9/2003 | Kuzzee et al. | |
| 6,723,683 B2 | 4/2004 | Crossman et al. | |
| 6,866,797 B1 | 3/2005 | Martin et al. | |
| 7,028,776 B2 | 4/2006 | Kirk | |
| 7,270,184 B2 | 9/2007 | Kolter et al. | |
| 7,419,937 B2 | 9/2008 | Rimmer et al. | |
| 7,426,961 B2 | 9/2008 | Stephenson et al. | |
| 7,459,209 B2 | 12/2008 | Smith et al. | |
| 7,491,682 B2 | 2/2009 | Gupta et al. | |
| 7,493,955 B2 | 2/2009 | Gupta et al. | |
| 7,494,711 B2 | 2/2009 | Kaufman et al. | |
| 7,598,209 B2 | 10/2009 | Kaufman et al. | |
| 7,686,081 B1 | 3/2010 | Becker | |
| 9,029,300 B2 | 5/2015 | Gupta | |
| 9,102,860 B2 | 8/2015 | Cawiezel et al. | |
| 2002/0128157 A1 | 9/2002 | Bates et al. | |
| 2004/0043906 A1 | 3/2004 | Heath et al. | |
| 2004/0060702 A1 | 4/2004 | Kotlar et al. | |
| 2004/0074646 A1 | 4/2004 | Kotlar et al. | |
| 2004/0138068 A1 * | 7/2004 | Rimmer | E21B 27/02 507/100 |
| 2004/0224155 A1 | 11/2004 | Barron et al. | |
| 2004/0244969 A1 | 12/2004 | Koltar et al. | |
| 2005/0022991 A1 | 2/2005 | Rao | |
| 2005/0028976 A1 | 2/2005 | Nugyen et al. | |
| 2005/0034868 A1 | 2/2005 | Frost et al. | |
| 2005/0072570 A1 * | 4/2005 | Lehman | C09K 8/52 166/304 |
| 2005/0115710 A1 | 6/2005 | Koltar et al. | |
| 2006/0065396 A1 | 3/2006 | Dawson et al. | |
| 2006/0091572 A1 | 5/2006 | Santra et al. | |
| 2006/0124301 A1 | 6/2006 | Gupta | |
| 2006/0124302 A1 * | 6/2006 | Gupta | C09K 8/516 166/279 |
| 2007/0036977 A1 | 2/2007 | Sinclair et al. | |
| 2007/0095528 A1 | 5/2007 | Ziauddin et al. | |
| 2007/0173417 A1 | 7/2007 | Kaufman et al. | |
| 2007/0202318 A1 | 8/2007 | Smith et al. | |
| 2008/0035339 A1 | 2/2008 | Welton et al. | |
| 2008/0035340 A1 | 2/2008 | Welton et al. | |
| 2008/0041589 A1 * | 2/2008 | Oakley | C09K 8/03 166/278 |
| 2008/0053657 A1 | 3/2008 | Alary et al. | |
| 2008/0058228 A1 | 3/2008 | Wilson | |
| 2008/0058229 A1 | 3/2008 | Berkland et al. | |
| 2008/0078547 A1 | 4/2008 | Sinclair et al. | |
| 2008/0182765 A1 | 7/2008 | Pershikova et al. | |
| 2008/0217012 A1 | 9/2008 | Delorey et al. | |
| 2008/0287324 A1 | 11/2008 | Pursley et al. | |
| 2009/0114247 A1 | 5/2009 | Brown et al. | |
| 2009/0131285 A1 | 5/2009 | Wang et al. | |
| 2009/0291861 A1 | 11/2009 | Sawdon | |
| 2009/0308610 A1 | 12/2009 | Windebank et al. | |
| 2009/0325825 A1 | 12/2009 | Gupta et al. | |
| 2010/0059224 A1 | 3/2010 | Palamara et al. | |
| 2010/0175875 A1 | 7/2010 | Becker et al. | |
| 2012/0012326 A1 * | 1/2012 | Darby | C09K 8/524 166/310 |
| 2012/0252706 A1 | 10/2012 | Steiner | |
| 2012/0273197 A1 * | 11/2012 | Gupta | C04B 38/009 166/278 |
| 2012/0318515 A1 | 12/2012 | Cawiezel et al. | |
| 2013/0029883 A1 | 1/2013 | Dismuke et al. | |
| 2013/0126158 A1 * | 5/2013 | Gupta | E21B 47/00 166/250.12 |
| 2015/0330197 A1 | 11/2015 | Brannon et al. | |
| 2016/0030916 A1 | 2/2016 | Shen et al. | |
| 2017/0350236 A1 | 12/2017 | Shen et al. | |

FOREIGN PATENT DOCUMENTS

| | | |
|---|---|---|
| GB | 2298440 | 9/1996 |
| GB | 2520018 | 5/2015 |
| WO | 99/36668 A1 | 7/1999 |
| WO | 99/54592 | 10/1999 |
| WO | 200011949 A1 | 3/2000 |
| WO | 2002040827 A1 | 5/2002 |
| WO | 2005/017313 A1 | 2/2005 |
| WO | 2006129258 A1 | 12/2006 |
| WO | 2008032067 A1 | 3/2008 |
| WO | 2016014310 A1 | 1/2016 |

OTHER PUBLICATIONS

P.J.C. Webb AEA Technology PLC, T.A., et al; Economic and Technical Advantages of Revolutionary New Delivery System for Fractured and Gravel Packed Wells; SPE 38548; 1997.

(56) References Cited

OTHER PUBLICATIONS

P.J.C. Webb Aea Technology PLC, T.A., et al; Economic and Technical Features of a Revolutionary Chemical Scale Inhibitor Delivery Method for Fractured and Gravel Packed Wells: Comparative Analysis of Onshore and Dffshore Subsea Applications; SPE 39451; 1998.
Norris, et al; Maintaining Fracture Performance Through Active Scale Control; SPE 68300; 2001.
Norris, et al; Hydraulic Fracturing for Reservoir Management Production Enhancement, Scale Control and Asphaltine Prevention; SPE 71655; 2001.
McInnich, et al; New Relationship Between Oil Company and Service Company Rejuvenates a Mature North Sea Gas Field; SPE 78327; 2002.
Pallanich; Slow-release medication relieves deepwater headache; Offshore Engineer; Aug. 2007.
Szymczak et al; Treat production problems before they occur; E&P; Jul. 2008.
Weirich et al., Field Application of Chemically Treated Substrate in Pre-Packed Well Screen; SPE 141054; Society of Petroleum Engineers; Manama Bahrain, Mar. 2011.
Sasol Germany GmbH; "Boehmite, High Purity Alumina and Hydrotalcite"; Sasol Germany GmbH; Hamburg Germany 2007.
Sasol; "Aluminum Oxied, A1203"; Material Safety Data Sheet; version 1.2; Sasol; Hamburg Germany; Aug. 2007.
Carbo Ceramics "Carbo EconoProp"; Carbo Ceramics; Houston, Texas; 2010.
D.M. Frigo et al; Chemical Inhibition of Halite Scaling in Topsides Equipment; SPE 60191; 2000.

\* cited by examiner

METHOD OF USING A SCREEN CONTAINING A COMPOSITE FOR RELEASE OF WELL TREATMENT AGENT INTO A WELL

FIELD OF THE DISCLOSURE

A method for releasing a well treatment agent into a well is provided wherein a screen is introduced into the well, the screen is sealed and contains a well treatment composite. The well treatment composite contains at least one well treatment agent and a substrate for the well treatment agent. The well treatment agent is slowly released from the substrate and passes from the screen into the well containing produced fluids.

BACKGROUND OF THE DISCLOSURE

Fluids produced from wells typically contain a complex mixture of components including aliphatic hydrocarbons, aromatics, hetero-atomic molecules, anionic and cationic salts, acids, sands, silts and clays. The nature of these fluids combined with the severe conditions of heat, pressure, and turbulence to which they are often subjected, are contributory factors to scale formation, salt formation, paraffin deposition, emulsification (both water-in-oil and oil-in-water), gas hydrate formation, corrosion, asphaltene precipitation and paraffin formation in oil and/or gas production wells and surface equipment.

Such contaminants typically restrict the movement of fluids in production piping and further potentially plug flow paths of fluids (including reservoir flow paths). For instance, common mineral scales such as calcium carbonate, calcium sulfate, or barium sulfate often precipitate from produced water and create blockages in flow paths in production tubulars. The formation and deposition of such contaminants typically decreases permeability of the subterranean formation, reduces well productivity, and, in some cases, completely blocks the tubing. In addition, such conditions shorten the lifetime of production equipment.

Well treatment agents are often used in production wells to prevent the deleterious effects caused by such deposits and precipitates. For instance, scaling in the formation (as well as in production lines downhole) is often controlled using scale inhibitors.

Treatments to remove deposits and inhibit the formation of deposits include the use of various mechanical preventative techniques such as scrapers or reamers and chemical treatment agents such as inhibitors, acids and converters. While mechanical tools are effective when the tubular is at an approximate 180° to the point of entry (as gravity helps pull the treatment device into the well), they have limited effectiveness when the tubular being treated is deviated, as in a horizontal well or "S" shaped configuration. The flexibility of mechanical tools makes it difficult to push a long distance past a severe deviation or multiple deviations. Chemical prevention or remedial techniques can be effective if the treatment can be delivered reliably to the target location and in sufficient quantity to address the issues.

Chemical treatment agents may be delivered to deposits by the technique of "downhole squeezing" wherein a slug of a well treatment composition is injected into the annulus of the well, using a pre-flush, squeeze, and over flush treatment before the well can be returned to normal function. This technique requires large volumes of treatment and flush fluid in horizontal wells with a large area of perforated interval. Further treatments are typically required as the chemical residual is depleted, once again requiring large volumes of flush and treatment into the well. Such treatment methods are typically inefficient in horizontal wells because it is difficult to ensure the treatment is delivered to all the intended area. Further, the flush and chemical additives often require large pumps and holding tanks which can add significant costs to the application.

Solid chemical additives in the form of a slurry are further often used. This type of treatment is effective in vertical wells but requires a flush to aid in delivery of the treatment agent to the bottom of the well. In a deviated well such as a horizontal well or well with multiple deviations such as an "S" shaped completion, it is important that the slurry mass not be too heavy in order for the flush to be carried past the deviation. If the density of the slurry is too high, the slurry just settles beyond the deviation.

Capillary tubing lengths are frequently installed in wells to aid in delivery of a chemical treatment. This technique is effective in its intended function but is expensive and requires specialized equipment to install. Further, capillary tubing may not be able to extend to great depths if the deviation angle is severe or the piping extends far beyond the bend.

While solid additives have been added to the well during the completion stage, this technique has only been proven to be an effective delivery method in new wells when the opportunity to spot the chemical additive is available.

Other methods for introducing well treatment agents into production wells include forcing a liquid well treatment agent into a targeted zone of a formation by application of hydraulic pressure from the surface. In most cases, such treatments are performed at downhole injection pressures below that of the formation fracture pressure. Alternatively, the delivery method may consist of placing a solid well treatment agent into the producing formation in conjunction with a hydraulic fracturing operation. This method is often preferred because it puts the treatment agent in contact with the fluids contained in the formation before such fluids enter the wellbore where deleterious effects are commonly encountered.

A principal disadvantage of such methods is the difficulty in releasing the well treatment agent into the well over a sustained period. As a result, treatments must repeatedly be undertaken to ensure that the requisite level of treatment agent is continuously present in the well. Such treatments result in lost production revenue due to down time.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for alternative treatment methods for introducing well treatment agents into oil and/or gas wells wherein the treatment agent may be released over a sustained period of time and wherein continuous attention of operators over prolonged periods is unnecessary.

SUMMARY OF THE DISCLOSURE

In an embodiment disclosed herein, a method of inhibiting or controlling the rate of release of a well treatment agent in a well or in a subterranean formation penetrated by the well is provided. In this embodiment, a screen is introduced into the well. The screen is enclosed. Inside of the screen is placed a well treatment composite. The well treatment composite comprises a well treatment agent and a substrate for the well treatment agent. The diameter of the openings in the screen is smaller than the diameter of the substrate of the composite. Over time, the well treatment agent and substrate disassociate from each other. When this occurs, the well treatment agent flows through the openings of the screen and into the reservoir.

In another embodiment disclosed herein, a method of inhibiting or controlling the rate of release of a well treatment agent in a well or in a subterranean formation penetrated by the well is provided. In this embodiment, a screen is introduced into the well. Particles of a well treatment composite are placed inside the screen. The screen is sealed such that the well treatment composite cannot be removed from inside the screen. The screen may be defined by multiple layers of meshed material. Alternatively, the screen of meshed material may be a single component folded or otherwise configured to form an interior, the well treatment composite being incapable of being removed from the interior of the screen. In an embodiment, the multiple layers or single component may be composed of wire.

The meshed material of the screen has small openings for passage of materials therethrough. The well treatment composite placed inside of the screen comprises a well treatment agent and a substrate for the well treatment agent. The diameter of the openings of the meshed material is smaller than the diameter of the substrate of the composite.

In another embodiment, a method of continuously releasing over time a well treatment agent into a well or to a subterranean formation penetrated by the well is provided. In this embodiment, a screen containing a composite within its interior is introduced into the well. The composite comprises a well treatment agent and a substrate. The diameter of the openings of the screen are smaller than the diameter of the substrate. The well treatment agent separates from the substrate over time and is released into the well or the subterranean formation by passing through the openings of the screen into the well or subterranean formation.

In yet another embodiment, a method of continuously releasing a well treatment agent into a killed well is provided. In this embodiment, a screen is introduced into a killed well. A composite is contained within the screen and is confined within a screen composed of multiple layers of material having small openings. The composite comprises a well treatment agent and a substrate. The diameter of the openings of the screen are sufficient to restrain flow of the substrate from the interior of the screen into reservoir fluids within the well. The diameter of the openings of the screen are further sufficient for the well treatment agent to flow from the interior of the screen into the reservoir fluids. The well treatment agent is released from the substrate of the composite and then flows through the openings of the screen into the well where reservoir fluids are located.

In another embodiment, a method of releasing a well treatment agent into reservoir fluids produced in a well is provided. In this alternative, particles of a well treatment composite are placed within a screen. The screen is defined by an enclosed area bordered by multiple layers of material having small openings. The screen with the well treatment composite is introduced into the well. The well treatment composite has a well treatment agent and a substrate for the well treatment agent. The diameter of the small openings of the screen are smaller than the diameter of the substrate of the well treatment composite. The well treatment agent is continuously released from the substrate while the composite is within the interior of the screen. Upon release, the well treatment agent flows through the small openings of the screen and into the interior of the well.

In an embodiment, the well treatment agent may be immobilized on the support.

In another embodiment, the well treatment agent may be immobilized within a matrix.

In another embodiment, the well treatment agent may be absorbed or adsorbed into the interstitial spaces of a porous particulate material. For instance, in one embodiment, the well treatment agent of the composite may be adsorbed into the interstitial spaces of a calcined porous metal oxide. The porosity and permeability of the porous particulate material is such that the adsorption or absorption of the well treatment agent onto the surface or into the interstitial spaces of the porous particulate material may occur.

In another embodiment, the well treatment agent may be adsorbed onto a water-insoluble adsorbent.

The well treatment composite may be further used in the stimulation of a well by being introduced into a subterranean formation or into the wellbore penetrating the subterranean formation. The well treatment composite may exhibit the strength of a conventional proppant yet allow for the slow release of one or more well treatment agents into the formation and/or wellbore. In some instances, the well treatment composite may be used as the proppant per se.

The well treatment composite may also be used in stimulation treatments as a component of a fracturing fluid or acidizing fluid, such as a matrix acidizing fluid. The composite has particular applicability in completion fluids containing zinc bromide, calcium bromide calcium chloride and sodium bromide brines. Such fluids may be introduced down the annulus of the well and, when desired, flushed with produced water.

The well treatment composite may be a nano-sized calcined porous substrate (adsorbent) of high surface area onto which is applied the well treatment agent. The well treatment agent may be slowly released from the adsorbent and may be slowly released into a proppant pack.

In an embodiment, the composite of well treatment agent and substrate may be formed into a shaped article, such as a pellet. The shaped article may be formed from a binder and the well treatment composite. The rate of release of the well treatment agent into production fluids within the well may be controlled by placing the shaped compressed article into the screen and then introducing the screen into the well. The well treatment agent in the compressed article is continuously released into the interior of the well.

In a particularly preferred embodiment, the composites are used in wells in order inhibit the formation of scales, control the formation of scales or retard the release of scale inhibitors into the well. For instance, the composite may be used in completion or production services. The composites may be used in the well to remove undesired contaminants from or control the formation of undesired contaminants onto tubular surface equipment within the wellbore.

Accordingly, the present disclosure includes features and advantages which are believed to enable it to advance downhole tool technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

In order to understand the drawings more fully referred to in the detailed description herein, a brief description of each drawing is presented, in which.

DETAILED DESCRIPTION OF THE PREFERRED EMBODIMENTS

Figure 1A:
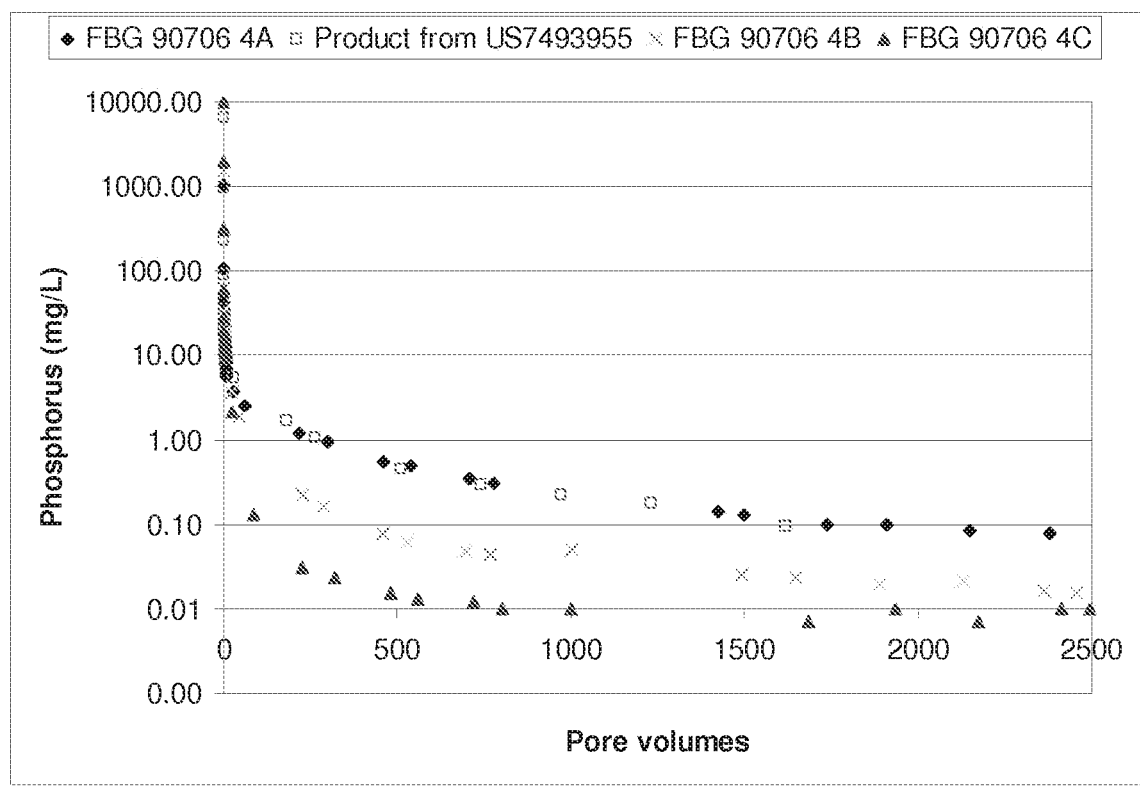
FIG. 1A and FIG. 1B are release profiles of a scale inhibitor in a high strength composites containing porous alumina adsorbents between 0 to 2,500 pore volumes and 0 to 10,000 pore volumes, respectively.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

A well treatment composite for use in the disclosure comprises at least one well treatment agent and a substrate. The well treatment agent is associated with a substrate. As used herein, the term "associated" refers to the nexus between the treatment agent and the substrate which enables them to be combined to form a composite. The term "associated" shall not be restricted however to a chemical reaction between the treatment agent and the substrate. As discussed further, the term may refer to adsorption of the well treatment agent onto the substrate, absorption of the well treatment agent into the matrix of the substrate, absorption into or adsorption of the well treatment agent onto the pores of the substrate, immobilization of the well treatment agent on the substrate, etc.

Over time, the well treatment agent disassociates from the substrate under in-situ conditions. In an embodiment, the well treatment agent may be adsorbed onto the surface of the substrate. In another embodiment, the well treatment agent may be absorbed into the pores of the substrate. In another embodiment, the well treatment agent may be impregnated within the substrate.

The composite is introduced into the well within a screen. The screen is placed in the well. The openings in the screen are sufficiently small to prevent the substrate of the composite from entering the well. As such, upon release of the well treatment agent, the well treatment agent flows through the openings of the screen into the well while the substrate remains within the screen assembly.

Figure 8:
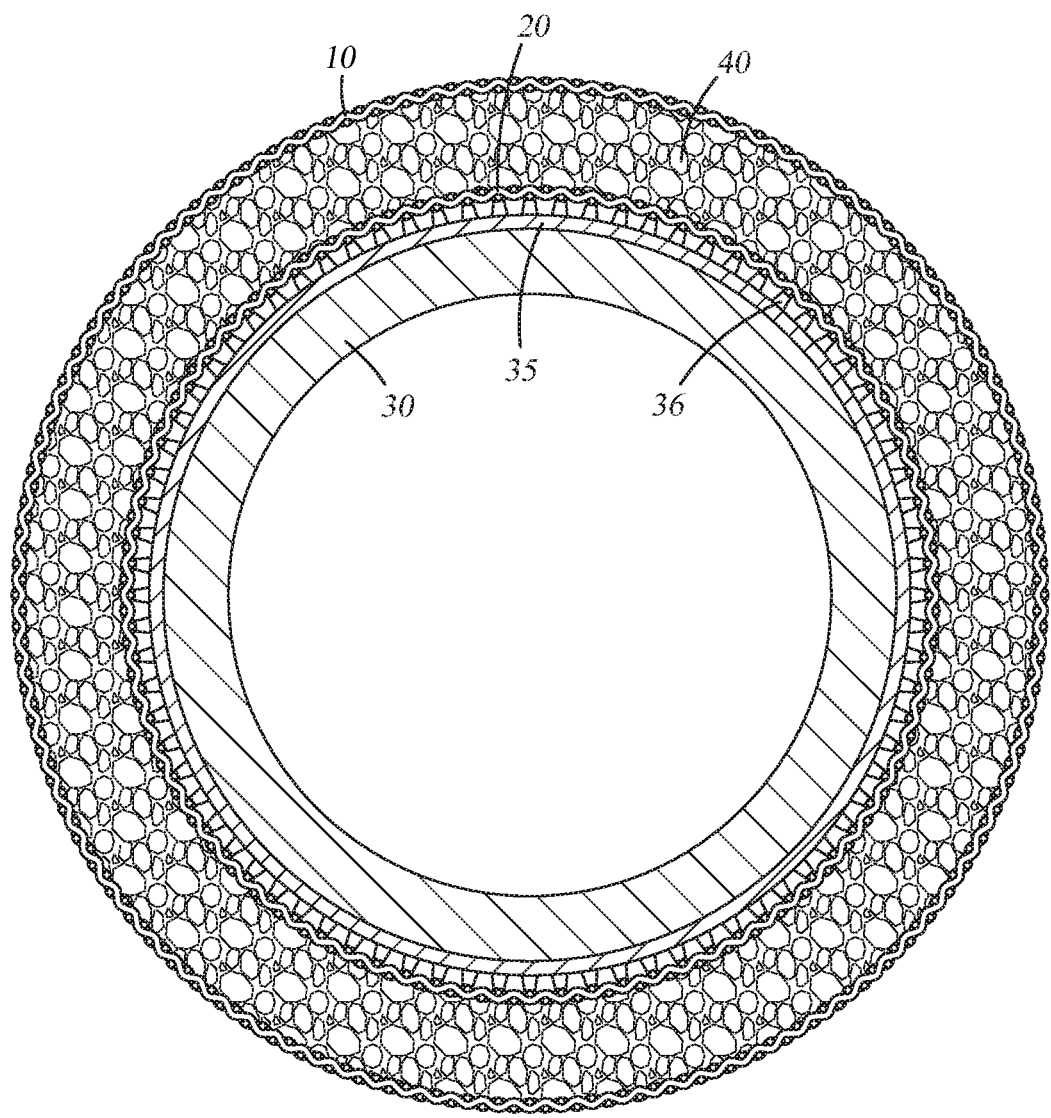
FIG. 8 is a cross sectional view of a representative screen assembly for use in the method disclosed herein.

The screen described herein may be a component of a screen assembly. FIG. 8 is a typical screen assembly which may be used. Referring to FIG. 8, the screen assembly contains a screen which may be composed of multiple layers of wire 10 and 20; wire 10 and wire 20 forming the outer screen and inner screen, respectively, of the screen. The wire layers are wrapped around base pipe 30 connected to the lower end of a string of tubing. Multiple spacer bars 36 may be provided between sleeve 35 and inner wire as well. One or more spacer bars may also be between sleeve 35 and base pipe 30. Composite 40 is typically packed within the screen to provide a fluid-permeable matrix within. The diameter of the opening in the screen (mesh) are smaller than the diameter of the substrate of the composite. Thus, the openings can reduce or substantially preventing the passage of the substrate from the screen into the wellbore while at the same time allowing passage of the well treatment agent from the screen into the wellbore.

The screen assembly may further contain multiple layers of wrapped wires. For instance, the screen assembly may be composed of an inner wire layer, an outer layer and an intermediate layer. A spacer bar or rib may hold the intermediate layer from the inner layer as well as holding intermediate layer from the outer layer.

Various configurations of screens and screen assemblies are known in the art and may be used provided the mesh size of the screen is small enough to retain the substrate of the composite within the screen while permitting the flow of well treatment agent into the fluids within the well. Such fluids include the aqueous fluid water or hydrocarbon liquid contained in the subterranean formation.

The screen may be used in completion or production services. The well treatment composite within the screen is typically used to remove contaminants from or control the formation of contaminants onto tubular surface equipment within the wellbore.

Typically, the screen is placed into the well after the well has been stimulated and after the start of production of hydrocarbons from the well.

In a preferred embodiment, the well is killed by placing a heavy fluid or mud ("kill mud") into the wellbore to suppress the pressure of the reservoir fluids and thus prevent flow of the reservoir fluids. After the well kill, the screen is lowered into the well. Production of the well may be resumed at a later point.

In another embodiment, the well may be shut-in after completion of pumping. The screen may then be inserted into the well during shut-in or shortly thereafter and prior to resuming of pumping of fluids into the well.

In a preferred embodiment, the screen is placed into an open (uncased) well.

The well treatment agent is generally capable of being dissolved at a generally constant rate over an extended period.

Typically, the specific gravity of the well treatment composite is less than or equal to 3.75 g/cc.

The amount of well treatment agent in the composite is normally from about 1 to 50 weight percent, preferably from about 14 to about 40 weight percent.

The well treatment agent is preferably water soluble or soluble in aliphatic and aromatic hydrocarbons. When fluid is produced in the well, the well treatment agent may be released from the substrate into its respective solubilizing liquid.

The composite does not require excessive amounts of well treatment agents. The amount of well treatment agent in the composite is that amount sufficient to effectuate the desired result over a sustained period of time and may be as low as 1 ppm. Generally, the amount of well treatment agent in the composite is from about 0.05 to about 5 (preferably from about 0.1 to about 2) weight percent based upon the total weight of the composite.

When the screen is placed into a well, the well treatment agent slowly dissolves at a generally constant rate over an extended period of time in the water or hydrocarbons which are contained in the formation and/or well. The composite therefore permits a continuous supply of the well treatment agent into the targeted area. Generally, the lifetime of a single treatment using the composite is between six and twelve months and may be in excess of 3 years depending upon the volume of water or hydrocarbons produced in the production well and the amount of well treatment agent bound to the substrate. As the oilfield fluid passes through or circulates around the well treatment composites, the well treatment agent slowly desorbs. In so doing, the composites are characterized by time-release capabilities. The gradual disassociation of the well treatment agent from the substrate insures delivery of the well treatment agent to produced fluids for extended periods of time, typically extending for periods of time greater than a year and even as long as five years. Typically the resulting concentration of the well treatment agent in the wellbore is between from about 1 to about 50 ppm and may be as low as 1 ppm. Such small amounts of well treatment agent may be sufficient for up to 1,000 pore volumes.

An exemplary well treatment composite for use herein may be a well treatment agent immobilized on a support. These includes those wherein the well treatment agent is adsorbed onto a water-insoluble adsorbent such as those disclosed in U.S. Pat. Nos. 7,491,682 and 7,493,955, both of which are herein incorporated by reference.

The water insoluble adsorbent may be any of various kinds of commercially available high surface area materials which may adsorb to the desired well treatment agent. Typically, the surface area of the adsorbent of the well treating composite is between from about 1 $m^2/g$ to about 100 $m^2/g$.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The weight ratio of well treatment agent to water-insoluble adsorbent is generally between from about 90:10 to about 10:90.

The adsorption of the liquid (or solution of) well treatment agent onto the solid adsorbent limits the availability of the free well treatment agent in water. In addition, the composite itself has limited solubility in water. When placed into a production well, the well treatment agent slowly dissolves at a generally constant rate over an extended period of time in the water which is contained in the formation. The controlled slow release of the agent is dependent upon the surface charges between the well treatment agent and adsorbent which, in turn, is dependent upon the adsorption/desorption properties of the agent to adsorbent.

Another exemplary well treatment composite for use herein may be composed of a porous particulate and at least one well treatment agent. The well treatment agent is preferably hydrocarbon-soluble or water-soluble. The porosity and permeability of the porous particulate is such that the well treatment agent may be absorbed into the interstitial spaces of the porous particulate material. The porous particulate is preferably an untreated porous ceramic, inorganic oxide or an organic polymeric material. Suitable porous particulates include aluminosilicates, silicon carbide, alumina and other silica-based materials. Such composites include those set forth in U.S. Pat. No. 7,598,209, herein incorporated by reference.

Typically, the particle size of the porous particulate of such composites is typically between from about 0.3 mm to about 5 mm, preferably between from about 0.4 to about 2 mm.

The porosity and permeability of the porous particulate is such that the well treatment agent may be absorbed into the pores of the porous particulate material. Typically, the porosity of the porous particulate is between from about 5 to about 30 volume percent. A commercially available instrument which uses mercury intrusion, such as the AutoPore Mercury Porosimeter (Micromeritics, Norcross, Ga.), for measuring the internal porosity of the particulate and the interstitial volume (of a pack) may be used to determine the porosity of the porous particulate. Examples of types of materials suitable for use as porous particulates include particulates having a porous matrix.

The porous particulates are generally spherical and insoluble in well fluids under subterranean conditions, such as at temperatures less than about 250° C. and pressures less than about 80 MPa. The particulates may be sufficiently strong to be used on their own at high pressures. They may further be used in conjunction with other well treatment agents including non-porous proppant materials, such as sand.

The porous particulate of the composite may be any naturally occurring or manufactured or engineered porous ceramic particulate, as well as any organic polymeric material, that has an inherent and/or induced porosity and exhibits the requisite physical properties, such as particle characteristics, desired strength and/or apparent density, to fit particular downhole conditions for well treating.

The porous ceramic particulates may be selectively manufactured from raw materials such as those described in U.S. Pat. Nos. 5,188,175; 4,427,068; and 4,522,731, which are each incorporated herein by reference, such as by inclusion of selected process steps in the initial material manufacturing process to result in a material that possesses desired characteristics of porosity, permeability, apparent density or apparent specific gravity (ASG) and combinations thereof.

Suitable as inorganic ceramic materials are alumina, magnetic glass, titanium oxide, zirconium oxide, silicon carbide, aluminosilicates and other silica-based materials.

Examples of non-natural porous particulate materials for use herein include, but are not limited to, porous ceramic particles, such as fired kaolinitic particles, as well as partially sintered bauxite. The porous particulates may further be porous natural ceramic materials, such as lightweight volcanic rocks, like pumice, as well as perlite and other porous "lavas" like porous (vesicular) Hawaiian Basalt, porous Virginia Diabase and Utah Rhyolite. Such naturally occurring materials may be strengthened or hardened by use of modifying agents to increase the ability of the naturally occurring material to resist deformation. A starch binder may be employed.

Further, suitable as porous particulates are those particulates set forth in U.S. Pat. No. 5,964,291.

Suitable polymeric materials for use as the porous particulate include thermosetting resins, such as polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin.

In a preferred embodiment, the porous particulate material is a relatively lightweight or substantially neutral buoyant particulate material. The term "relatively lightweight" shall refer to a particulate that has an ASG (API RP 56) that is substantially less than a conventional particulate material employed in hydraulic fracturing or sand control operations, e.g., sand (having an ASG, API RP 60, of 2.65) or bauxite (having an ASG of 3.55). The ASG of a relatively lightweight material is preferably less than about 2.4, more preferably less than or equal to 2.0, even more preferably less than or equal to 1.75, most preferably less than or equal to 1.25.

Further, blends of the referenced materials may be used for achieving desired well treatment results and/or costs. Blends may consist of the referenced porous particulates as well as particulates not included within the porous particulates described herein. Particle types which may be selected for use in such blends include such non-porous particulates like conventional sand, such as Ottawa sand.

Such different types of particulates may be selected, for example, to achieve a blend of different specific gravities or densities relative to the selected carrier fluid. For example, a blend of three different particles may be selected for use in a water fracture treatment to form a blend of well treatment particulates having three different specific gravities, such as an ASG of the first type of particle from about 1 to less about 1.5; an ASG of the second type of particle from greater than about 1.5 to about 2.0; and ASG of the third type of particle from about greater than about 2.0 to about 3.0; or in one specific embodiment the three types of particles having respective specific gravities of about 2.65, about 1.7 and about 1.2. In one example, at least one of the types of selected well treatment particulates may be selected to be substantially neutrally buoyant in the selected carrier or treatment fluid.

Since the well treatment agents employed in the composites are capable of being absorbed into the interstitial spaces of the porous particulates, the well treatment agents may be slowly released from the composite upon introduction into a targeted area. The composite describe herein therefore permits a continuous supply of the well treatment agent into the targeted area. The weight ratio of well treatment agent to water-insoluble absorbent is generally between from about 90:10 to about 10:90.

Another exemplary well treatment composite for use herein may be a calcined porous substrate prepared from nano-sized material onto which may be adsorbed at least one well treatment agent.

The porosity and permeability of the calcined porous substrate is such that the well treatment agent may also be absorbed into the interstitial spaces of the porous substrate. Typically, the surface area of the calcined porous substrate is between from about 1 $m^2/g$ to about 10 $m^2/g$, preferably between from about 1.5 $m^2/g$ to about 4 $m^2/g$, the diameter of the calcined porous substrate is between from about 0.1 to about 3 mm, preferably between from about 150 to about 1780 micrometers, and the pore volume of the calcined porous substrate is between from about 0.01 to about 0.10 cc/g.

The porous metal oxide is typically spherical and insoluble in well fluids under subterranean conditions, such as at temperatures less than about 250° C. and pressures less than about 80 MPa.

The porous substrate may be a metal oxide, such as alumina, zirconium oxide and titanium oxide. Typically, the porous substrate is alumina.

The adsorbent may be prepared by:

(a) mixing a metal oxide hydrosol (such as aluminum oxide hydrosol) containing a hydrate of the metal oxide or activated metal (such as activated alumina) and an additive component selected from carbon (such as carbon black) or a high molecular weight natural organic material (such as wood flour and starch) which is insoluble in aqueous solution up to a temperature of 50° C. and carbon with a solution of hydrolyzable base to form a mixture;

(b) introducing the mixture in dispersed form into a water-immiscible liquid having a temperature of from about 60° to 100° C., whereby gel particles are formed;

(c) aging the gel particles in the liquid at the temperature and subsequently in an aqueous base, such as an aqueous ammonia solution;

(d) recovering the aged particles; and then (e) calcining the recovered particles. During calcination, the additive component is removed.

The calcined particles have a lower bulk density when the additive component is present during calcinations than when the additive component is not present. Typically, the bulk density of the well treatment composite is between from about 75 to about 150 lb/ft.$^3$. In addition, combustion of the additive component during calcinations of the hydrosol results in formation of pores of the calcined metal oxide.

The metal oxide hydrosol may optionally contain a silica-containing substance which in their non-soluble form is coprecipitated with the metal oxide particles. The silica-containing substance is preferably a low-density silica, such as that prepared by hydrolysis of silicon tetrachloride in an oxyhydrogen flame and known under the designation pyrogenic silica.

In an embodiment, spherical metal oxide adsorbent may be prepared from a concentrated metal oxide hydrosol of a pH value in the range of about 3 to about 5 which, in turn, is prepared by dissolving metal in hydrochloric acid and/or metal chloride in aqueous solution or by dissolving metal hydroxychloride in water, the concentration of which is adjusted so that metal oxide derived from the sol amounts to 15 to 35% by weight, preferably to 20 to 30% by weight of the mass of the calcined particles. Metal oxide hydrate and/or activated metal, preferably of an average particle diameter of maximally 10μ, is then added to the hydrosol in an amount so that the metal oxide content amounts to 65 to 85% by weight, preferably 70 to 80% by weight of the calcined particles. Optionally, pyrogenic silica may be added to the hydrosol such that the SiO$_2$ content of the calcined particles amounts to 10 to 40% by weight. A soft to medium-hard wood flour may then added to the mixture, the wood flour being ground to a finer particle size such that it is present in a quantity of 5 to 35% by weight, preferably 10 to 25% by weight relative to the mass of the calcined particles. The hydrosol containing the wood flour may then be mixed with a concentrated aqueous solution of hexamethylene tetramine and then sprayed or dropped into a column filled with the mineral oil of a temperature of 60° C. to 100° C. The gel particles are then allowed to remain at the temperature of precipitation for a period of time from 4 to 16 hours; thereafter the gel particles are aged for 2 to 8 hours in aqueous ammonia solution, washed with water, dried at 100° C. to 150° C., or preferably at from about 120° C. to about 200° C., preheated to 250° C. to 400° C. and calcined at a temperature of 600° C. to about 1000° C.

Alternative methods for making metal oxide adsorbent are further disclosed in U.S. Pat. No. 4,013,587, herein incorporated by reference.

In a preferred embodiment, when the metal oxide adsorbent is alumina adsorbent, the adsorbent may be prepared by hydrolyzing aluminum alkoxides to render nano sized alumina, drying to remove water and then introducing the dried aluminum in a dispersed form into an oil at a temperature of from about 60° to 100° C., whereby gel particles are formed. The gel particles are then aged in the liquid and subsequently in an aqueous ammonia solution, recovered and then calcined. Nano sized alumina may be produced having an average diameter in the range from about 0.4 mm to about 1 mm.

Any of the well treatment composites may be compressed into shaped articles and the shaped articles placed into the screen of the screen assembly.

The shaped articles may be in the form of a sphere, cylinder, rod or any other shape which allows for the slow release of the well treatment agent into the targeted area. In a preferred embodiment, the shaped articles are shaped pellets. In some applications, the shaped particles are cylindrically shaped having a length of about 0.5 inch to about 6 inches, preferably from about 1 inch to about 2 inches and a diameter of from about 0.25 inch to about 4 inches, preferably from about 0.5 inch to about 1 inch.

In those instances where the shaped article is to be directly dropped into the well from the well head, the article is preferably spherical and is formed into a ball-like sphere having a diameter between from about ½ inch to about 3 inches, more preferably from about ¾ inch to about 2½ inches, most preferably approximately 1¾ inch. Such spheres resemble spherical balls.

The specific gravity of the shaped articles is generally between from about 1.1 to about 3. In a preferred embodiment, the specific gravity of the shaped articles is between from about 2 to about 2.5.

The binder, to which the composite is added, generally serves to hold the well treatment agent and any desired additives agents together during compression. Suitable binders may be an organic binder or inorganic binder. Typical organic binders are those selected from resole or novolac resins, such as phenolic resole or novolac resins, epoxy-modified novolac resins, epoxy resins, polyurethane resins, alkaline modified phenolic resoles curable with an ester, melamine resins, urea-aldehyde resins, urea-phenol-aldehyde resins, furans, synthetic rubbers, silanes, siloxanes, polyisocyanates, polyepoxys, polymethylmethacrylates, methyl celluloses, crosslink entangled polystyrene divinylbenzenes, and plastics of such polymers as polyesters, polyamides, polyimides, polyethylenes, polypropylenes, polystyrenes, polyolefins, polyvinyl alcohols, polyvinylacetates, silyl-modified polyamides and, optionally, a crosslinking agent. Typical inorganic binders include silicates, e.g., sodium silicate, aluminosilicates, phosphates, e.g., polyphosphate glass, borates, or mixtures thereof, e.g., silicate and phosphate.

The amount of binder added to the composite to form the compressed article is typically from about 0.5 to about 50, preferably from about 1 to about 5 percent based on the total weight of the binder and composite, prior to compression.

Prior to being shaped, a weighting agent may be combined with the composite and binder to impart to the shaped article a higher specific gravity. When present, the amount of weighting agent added to the composite is that amount needed to adjust the specific gravity of the shaped particulate to the requirements of the treated well. Suitable weighting agents include sand, glass, hematite, silica, sand, aluminosilicate, and an alkali metal salt or trimanganese tetraoxide.

The shaped particulates may be produced by procedures known in the art. Typically the shaped particulates are formed by combining the well treatment composite and, optional, weighting agent, with a binder and then compressing the mixture in a mold of the desired shape or extruding the mixture into its desired shape.

Exemplary of the process for making the shaped particulates is to combine the composite, prepared in accordance with the teachings set forth in U.S. Pat. No. 7,493,955 or 7,494,711, with an organic binder and then compressing the mixture at a temperature between from about 20° C. to about 50° C. at a pressure of from between 50 to about 5000 psi. The hardened particulates may then be screened to the desired size and shape. In another preferred embodiment, the shaped composites are produced by a continuous extrusion at a temperature between from about 400° C. to about and 800° C.

The shaped particulates may further be coated with a resin, plastic or sealant which is resistant to the hydrocarbons produced in the well. Suitable resins include phenolic resins like phenol formaldehyde resins, melamine formaldehyde resins, urethane resins, epoxy resins, polyamides, such as nylon, polyethylene, polystyrene, furan resins or a combination thereof.

The coating layer serves to strengthen the compressed article, protect the article from harsh environmental conditions, protect the article from rupturing as it is lowered into the well and to lengthen the time of release of the well treatment agent from the article. The coating layer may be applied to the article by mixing the article and coating material in a vessel at elevated temperatures, typically from about 200 to about 350, preferably around 250° F. An adherent, such as a resin adhesive or tackifying resin, may further be added to the vessel during mixing. The adherent may be used to assist the adhesion of the coating onto the compressed article. Alternatively, the coating layer may also be applied as a spray in a solvent based coating on the compressed article and then dried to remove the solvent.

In an embodiment where a solid well treatment is an inhibitor for scales, corrosion, salts or biocidal action, the treatment agent may desorb into produced water. In the absence of water flow, the well treatment agent may remain intact on the solid adsorbent. As another example, solid inhibitors for paraffin or asphaltene may desorb into the hydrocarbon phase of produced fluid.

In a preferred embodiment, the well treatment agent may be at least one member selected from the group consisting of demulsifying agents (both water-in-oil and oil-in-water), corrosion inhibitors, scale inhibitors, paraffin inhibitors, gas hydrate inhibitors, salt formation inhibitors and asphaltene dispersants as well as mixtures thereof.

Further, other suitable treatment agents include foaming agents, oxygen scavengers, biocides and surfactants as well as other agents wherein slow release into the production well is desired.

The well treatment agent is preferably a liquid material. If the well treatment agent is a solid, it can be dissolved in a suitable solvent, thus making it a liquid.

The composites defined herein are used in well treatment compositions such as fluids used for the treatment of gas wells or oils wells wherein it is desired to inhibit the formation of undesired contaminants, control the formation of undesired contaminants or retard the release of undesired contaminants into the well. For instance, the composite may be used in completion or production services. The composites disclosed herein may be used in the well to remove undesired contaminants from or control the formation of undesired contaminates onto tubular surface equipment within the wellbore.

In a preferred embodiment, the well treatment composite described herein effectively inhibits, controls, prevents or treats the formation of inorganic scale formations being deposited in subterranean formations, such as wellbores, oil wells, gas wells, water wells and geothermal wells. The composites described herein particularly efficacious in the treatment of scales of calcium, barium, magnesium salts and the like, including barium sulfate, calcium sulfate, and calcium carbonate scales. The composites may further have applicability in the treatment of other inorganic scales, such as zinc sulfide, iron sulfide, etc.

The well treatment composite may also be used to control and/or prevent the undesired formation of salts, paraffins, gas hydrates, asphaltenes as well as corrosion in formations or on surface equipment. Further, other suitable treatment agents include foaming agents, oxygen scavengers, biocides, emulsifiers (both water-in-oil and oil-in-water) and surfactants as well as other agents may be employed with the adsorbent when it is desired to slowly slow release such agents into the production well.

Suitable scale inhibitors are anionic scale inhibitors.

Preferred scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Further useful, especially for brines, are chelating agents, including diethylenetriaminepentamethylene phosphonic acid and ethylenediaminetetra acetic acid.

The well treatment agent may further be any of the fructans or fructan derivatives, such as inulin and inulin derivatives, as disclosed in U.S. Patent Publication No. 2009/0325825, herein incorporated by reference.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Paraffin inhibitors useful for the composites include, but are not limited to, ethylene/vinyl acetate copolymers, acrylates (such as polyacrylate esters and methacrylate esters of fatty alcohols), and olefin/maleic esters.

Exemplary corrosion inhibitors useful herein include but are not limited to fatty imidazolines, alkyl pyridines, alkyl pyridine quaternaries, fatty amine quaternaries and phosphate salts of fatty imidazolines.

Gas hydrate treating chemicals or inhibitors that are useful include but are not limited to polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary asphaltene treating chemicals include but are not limited to fatty ester homopolymers and copolymers (such as fatty esters of acrylic and methacrylic acid polymers and copolymers) and sorbitan monooleate.

Suitable foaming agents include, but are not limited to, oxyalkylated sulfates or ethoxylated alcohol sulfates, or mixtures thereof.

Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers include triazines, maleimides, formaldehydes, amines, carboxamides, alkylcarboxylazo compounds cumine-peroxide compounds morpholino and amino derivatives morpholine and piperazine derivatives, amine oxides, alkanolamines, aliphatic and aromatic polyamines.

Adsorption of the well treatment agent onto the porous metal oxide and into the interstitial spaces of the oxide reduces (or eliminates) the amount of well treatment agent required to be in solution. In light of the physical interaction between the well treatment agent and porous metal oxide, only a small amount of well treatment agent may be released into the aqueous or hydrocarbon medium.

For instance, where the well treatment agent is a scale inhibitor, the amount of scale inhibitor released from the composite is that amount required to prevent, or to at least substantially reduce the degree of, scale formation. For most applications, the amount of scale inhibitor released from the well treatment composite may be as low as ppm. Costs of operation are therefore significantly lowered.

Well treatment compositions containing the composites may be used in treatment operations near the wellbore in nature (affecting near wellbore regions) and may be directed toward improving wellbore productivity.

The following examples are illustrative of some of the embodiments described herein. Other embodiments within the scope of the claims herein will be apparent to one skilled in the art from consideration of the description set forth herein. It is intended that the specification, together with the examples, be considered exemplary only, with the scope and spirit of the disclosure being indicated by the claims which follow.

All percentages set forth in the Examples are given in terms of weight units except as may otherwise be indicated.

EXAMPLES

Example 1

In accordance with the procedure set forth in U.S. Pat. No. 4,013,587, alumina spheres were prepared by hydrolyzing aluminum alkoxide. The resulting spheres were then dried to remove the water. The dried aluminum was then dispersed into an oil at about 90° C. Gel particles were formed.

Water insoluble spherical particles of greater than 95% alumina were recovered as Sample A. The spherical alumina beads consisted of bohemite alumina (non calcined) having a 1 mm diameter, a pore volume of 0.5 cc/g and a surface area of 216 m2/g.

A portion of Sample A was calcined at 1200° C. for 2 hours to render spherical beads of 1 mm diameter (Sample B) composed of alpha/delta theta alumina and having a pore volume of 0.08 cc/g and a surface area of 3 $m^2/g$.

A portion of Sample A was calcined at 1400° C. for 2 hours to render spherical beads of 1 mm diameter (Sample C) composed of alpha alumina and having a pore volume of 0.03 cc/g and a surface area of 4 $m^2/g$.

Example 2

Each of Sample A, Sample B and Sample C were added at different weight percent loadings to commercial lightweight ceramic proppant, commercially available as CARBO LITE® from Carbo Ceramics Inc. of Dallas, Tex., and the crush was determined according to IS013503-2: Measurement of Properties of Proppants used in Hydraulic Fracturing and Gravel Packing Operations). The results are shown in Table I below wherein the Comparative Sample is a 10/50 mesh diatomaceous earth (Celite MP-79):

TABLE I

| STRESS, psi | CONCEN-TRATION | Comparative Sample CRUSH % | Sample A CRUSH % | Sample B CRUSH % | Sample C CRUSH % |
|---|---|---|---|---|---|
| 4000 | 0% | 0.24 | 0.15 | 0.15 | 0.15 |
| | 2% | NA | 0.68 | 0.36 | 0.32 |
| | 4% | NA | 0.83 | 0.24 | 0.34 |
| | 10% | 5.88 | 3.16 | 0.61 | 0.39 |
| 6000 | 0% | 0.92 | 0.92 | 0.92 | 0.92 |
| | 2% | 2.77 | 2.09 | 1.09 | 1.09 |
| | 4% | 5.08 | 4.18 | 1.09 | 0.90 |
| | 10% | 11.49 | 9.57 | 1.48 | 1.46 |
| 8000 | 0% | 5.29 | 5.44 | 5.44 | 5.44 |
| | 2% | 7.14 | 8.38 | 6.22 | 5.61 |
| | 4% | 10.23 | 9.72 | 5.15 | 5.15 |
| | 10% | 17.21 | 17.30 | 5.44 | 5.03 |
| 10000 | 0% | NA | 12.32 | 12.32 | 12.32 |
| | 2% | NA | 17.38 | 11.25 | 12.20 |
| | 4% | NA | 22.31 | 14.12 | 9.96 |
| | 10% | NA | 24.98 | 12.56 | 11.45 |

The results indicate that the non-calcined Sample A has strength comparable to the diatomaceous earth of the Comparative Sample, whereas calcined Sample B and Sample C had the strength of commercial ceramic proppant in that even after the addition of 10% by weight of Sample B or Sample C the crush strength of the combined proppant particle mixtures, even at 10,000 psi stress, was not altered.

Example 3

Scale inhibitor amino tri(methylene phosphonic acid) (ATMP), commercially available as Dequest 2000 from ThermPhos International BV was adsorbed onto each of Sample A, Sample B and Sample C to render Samples FBG-90706-4A, FBG-90706-4B and FBG-90706-4C respectively. These Samples were prepared by first adsorbing water on the Samples to determine how much water could be adsorbed. Water was added to the sample until the Sample appeared wet. Sample A was found to adsorb 0.698 g of $H_2O$/g of sample, Sample B adsorbed 0.362 g of $H_2O$/g of sample, and Sample C adsorbed 0.415 g of $H_2O$/g of sample. Next Dequest 2000 was added to each sample. Due to the low adsorbency compared to diatomaceous earth, two additions were followed to prepare the samples. In the first addition for Sample A, only 0.32 g of Dequest 2000/g of Sample A could be added. In the second addition, 0.25 g of Dequest 2000/g of Sample A could be added. This results in a product which contains about 22% active content. The method used to prepare the diatomaceous earth based product set forth in U.S. Pat. No. 7,493,955 was adapted to these alumina samples. For Sample B, only 0.31 g of Dequest 2000/g of Sample B could be added followed by 0.13 g of Dequest 2000/g of Sample B in the second addition. This results in a product which contains about 18% active content. For Sample C, only 0.23 g of Dequest 2000/g of Sample C could be added followed by 0.08 g of Dequest 2000/g of Sample C in the second addition. This results in a product which contains about 13.5% active content. The properties of each of these samples is set forth in Table II below:

TABLE II

| Alumina | | FBG 90607-4A Sample A | FBG 90607-4B Sample B | FBG 90607-4C Sample C |
|---|---|---|---|---|
| Nominal Content | % by weight | 22 | 18 | 13.5 |
| Determined Content | | 19.6 | 15.5 | 12.0 |
| Bulk Density | Loose lb/ft3 | 36 | 81 | 97 |
| | Packed | 43 | 90 | 105 |
| Specific gravity | H2O = 1 | 4.22 | 3.50 | 3.43 |
| pH | 10% Slurry | 2.16 | 1.65 | 1.76 |

Example 4

Figure 1B:
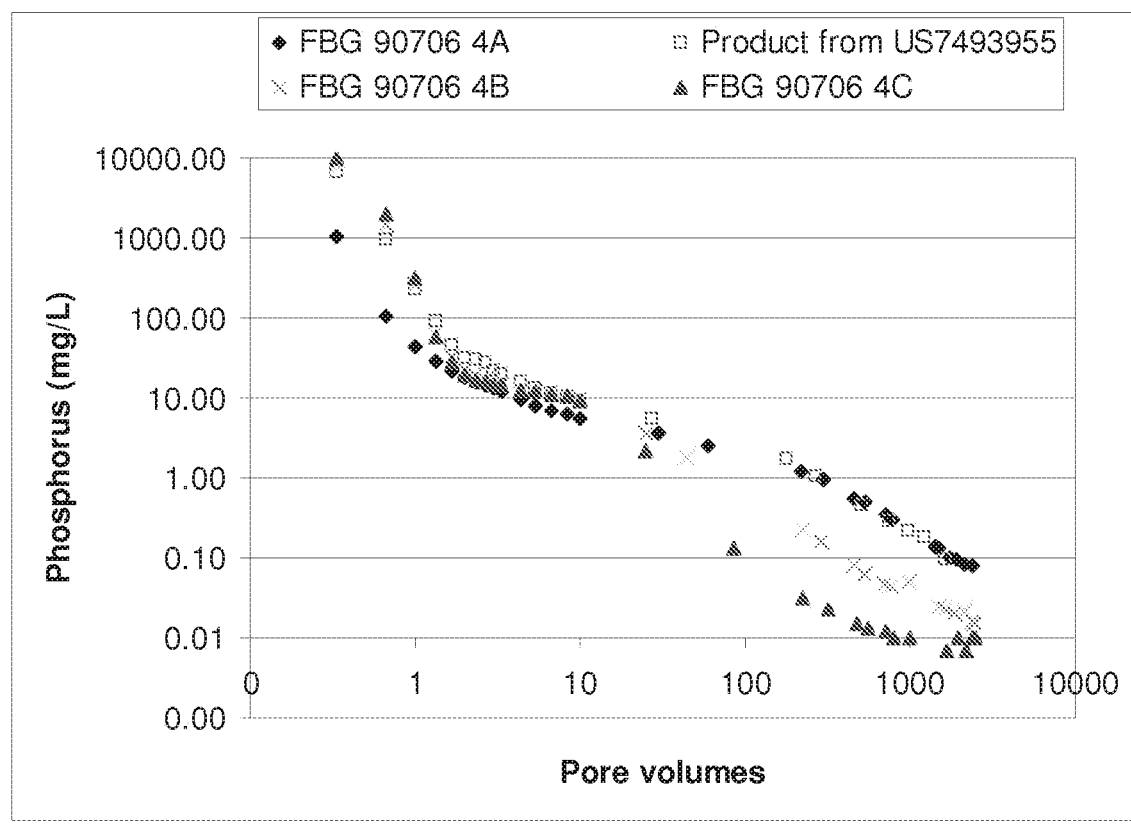

The elution characteristic of the solid composites of Example 3 were determined by packing 20/40-mesh Ottawa sand and solid inhibitor (2% by weight of the sand) into a 35-cm-long stainless steel column (inner diameter=1.08 cm). The pore volume was approximately 12 mL. The column was eluted with synthetic brine (0.025 mol/L $CaCl_2$, 0.015 mol/L $NaHCO_3$, 1 mol/L NaCl, sparged with 100% $CO_2$) at 60° C. with a flow rate of 120 mL/hour. The synthetic brine was at saturation with calcite to simulate typical connate brine in the formation. The effluent solution was collected and analyzed for phosphorus and Ca concentration to obtain the inhibitor release profile. The results are shown in FIG. 1A and FIG. 1B. The minimum effective concentration for scale inhibition was 0.1 ppm.

Example 5

Five alumina samples labeled 23A, 23B, 23C, 23D and 23E were prepared. 23-A was the same as Sample A (1 mm alumina bead, not calcined); 23-B was the same as Sample B (1 mm alumina beads calcined at 1200° C. for 2 hours) and 23-C was the same as Sample C (1 mm alumina bead calcined at 1400° C. for 2 hours). Samples 23D and 23E were prepared using the same protocols as Sample B and Sample C, respectively, except the diameter of the spherical beads was adjusted to 0.8 mm. Each of 23A, 23B, 23C, 23D and 23E were heated to 225° F. and cooled to room temperature in a desiccator before the addition of the ATMP solution. A 55% by weight solution of ATMP was prepared. Three additions were made to each sample and the amount that was able to be adsorbed is set forth in Table III below:

TABLE III

| | g Alumina | g 1st Addition | g 2nd Addition | g 3rd Addition | % ATMP by weight sample |
|---|---|---|---|---|---|
| 23A | 50.001 | 3.00 | 3.25 | 0.84 | 7.2 |
| 23B | 50.005 | 9.43 | 6.52 | 1.34 | 16.0 |
| 23C | 50.004 | 5.29 | 1.83 | 0.70 | 7.9 |
| 23D | 50.008 | 9.81 | 9.10 | 3.98 | 20.1 |
| 23E | 50.006 | 9.93 | 3.80 | 2.02 | 14.8 |

The results shown in Table III are in contrast to 22.1% for Sample A, 18.1% for Sample B and 13.5% for Sample C.

Example 6

Figure 2:
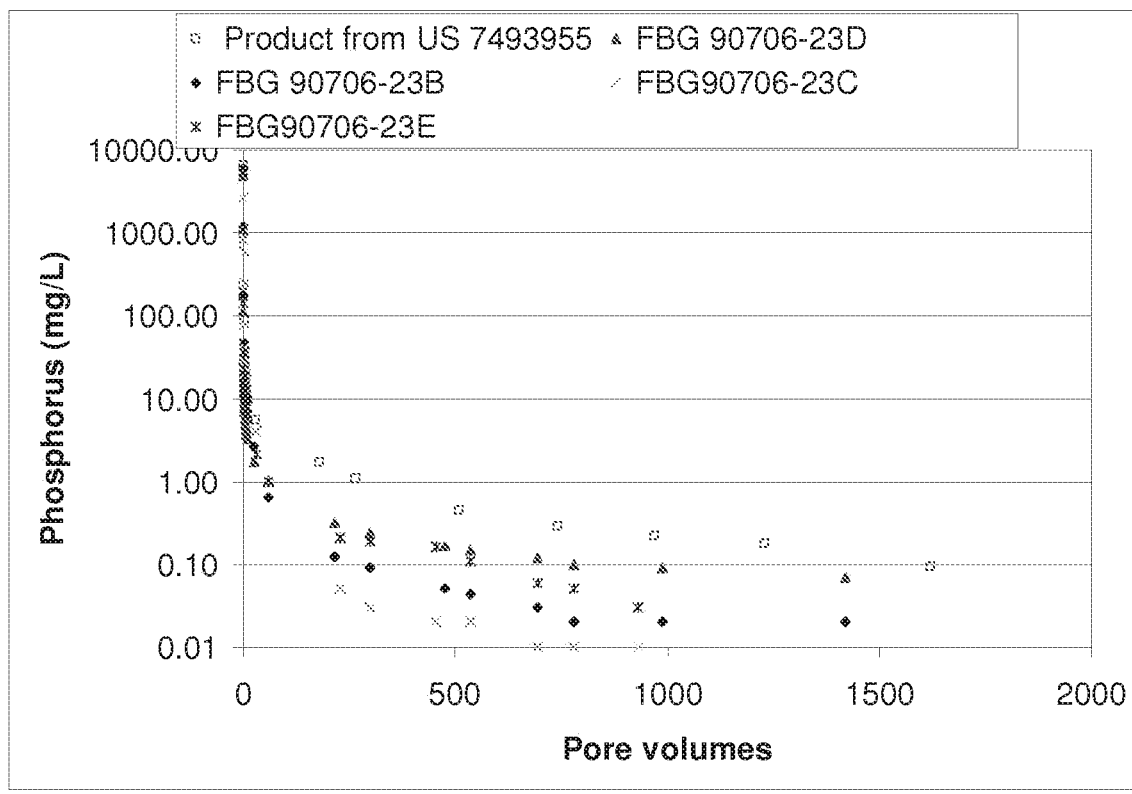
FIG. 2 is a release profile of a scale inhibitor in high strength composites containing porous alumina adsorbent of varying diameter between 0 to 2,000 pore volumes.
Figure 3:
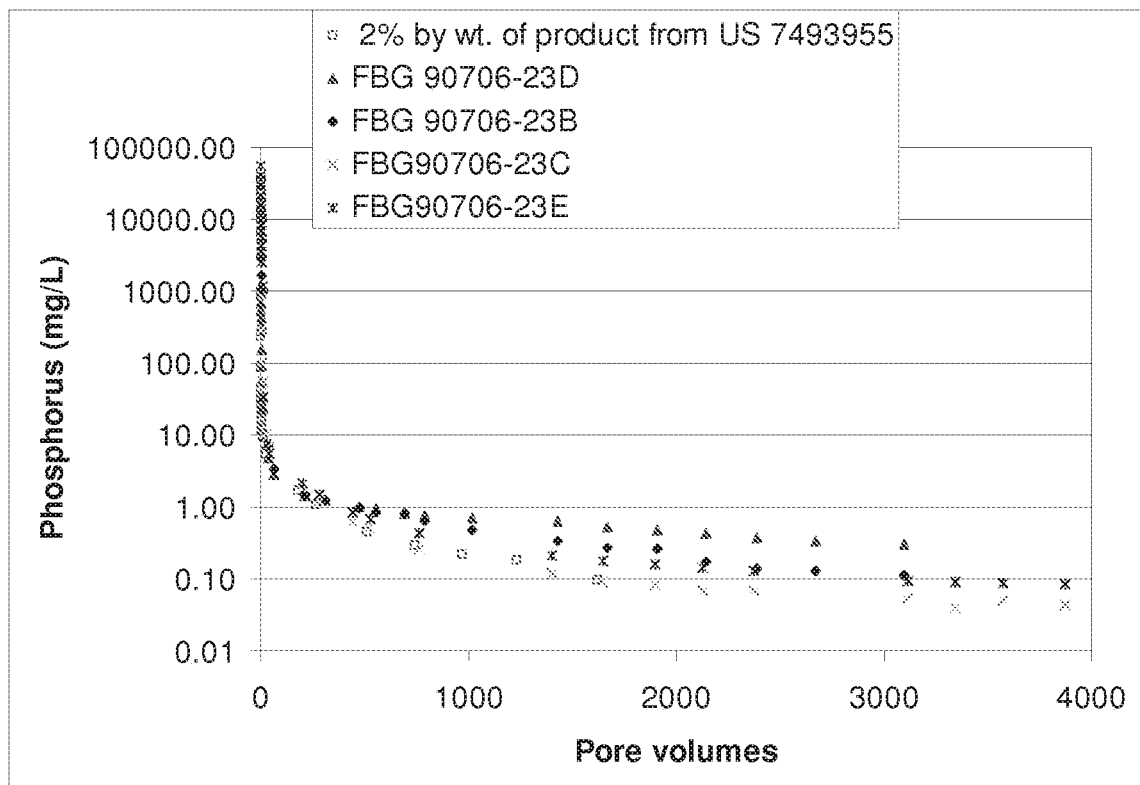
FIG. 3 is a release profile of a scale inhibitor in high strength composites containing porous alumina adsorbent of varying diameter using a sand pack using 50% of the particles as in FIG. 2.

The elution of Samples 22B, 23C, 23D, 23E and the Comparative Sample of Example 2 were performed as set forth by the method in Example 4 with 2% of the particles by weight of the sand in the column. The results are shown in FIG. 2. The results are similar to those illustrated in FIG. 1A and FIG. 1B. Since there is commercial interest in using higher percentage of the particles in a proppant pack, the elution studies were performed on the samples at 50% of the particles in the sand pack and the results are shown in FIG. 3. FIG. 3 indicates much slower release and longer period of effective inhibition.

Example 7

Four samples were prepared of two different sizes (0.8 mm and 1.0 mm diameter before calcining) in accordance with the procedure set forth in Example 1. The four samples were labeled as CO10118 (0.8 mm), CO10118 (1 mm), CO10524 (0.8 mm) and CO10593 (1 mm). Sample CO10118, after calcining, had a size of 25 mesh (0.71 mm) and a surface area of 1 $m^2/g$; sample CO10118, after calcining, had a size of 30 mesh (0.59 mm) and a surface area of less than 1 $m^2/g$. Sample CO10524, after calcining, had a size of 30 mesh (0.59 mm) and a surface area of 5.6 $m^2/g$ and sample CO10593, after calcining, had a size of 20 mesh (0.84 mm) and a surface area of 7.3 $m^2/g$. Crush analysis was conducted on each of the samples as well as on ECONOPROP®, a commercial proppant available from Carbo Ceramics Inc. Further, two other samples labeled 25 mesh APA1.0/3C 12853 (surface area 3.1 $m^2/g$) and 30 mesh APA0.8/3C 12852 were also prepared. The crush data on these is presented also in Table 4. The crush data of each sample was generated using a pluviation method to load the proppant in the API crush cell. The results are shown in Table IV below:

TABLE IV

| | Crushed Fines % | | | |
|---|---|---|---|---|
| Sample | 5000 psi | 6000 psi | 8000 psi | 10000 psi |
| 25 Mesh 0.8 mm C010118 (Surface Area: 1 $m^2/g$) | 0.5 | 0.8 | 1.9 | 8.4 |
| 30 Mesh 1.0 mm C010118 (Surface Area: <1 $m^2/g$) | 5.2 | 5.9 | 11.8 | 18.9 |
| 30 Mesh 0.8 mm C010524 (Surface Area: 5.6 $m^2/g$) | 9.0 | 12.1 | 24.6 | 37.6 |

TABLE IV-continued

| | | Crushed Fines % | | |
|---|---|---|---|---|
| Sample | 5000 psi | 6000 psi | 8000 psi | 10000 psi |
| 20 Mesh 1.0 mm C010593 (Surface Area: 7.3 m$^2$/g) | 26.6 | 36.5 | 49.2 | 61.4 |
| 25 Mesh EconoProp | NA | NA | 21.5 | 24.9 |
| 30 Mesh EconoProp | 11.1 | 12.2 | 15.0 | 20.6 |
| 25 Mesh APA 1.0/3 C12853 (Surface Area: 3.1 m$^2$/g) | 1.2 | 2.2 | 8.6 | 17.5 |
| 30 Mesh APA 0.8/3 C12852 (Surface Area: 3.1 m$^2$/g) | 0.7 | 1.5 | 4.4 | 11.6 |
| 25 Mesh EconoProp | NA | NA | 21.4 | 26.0 |
| 30 Mesh EconoProp | 4.9 | 5.3 | 10.1 | 14.7 |

Example 8

Scale Inhibitor amino tri(methylene phosphonic acid) (ATMP), commercially available as Dequest 2000 from ThermPhos International BV was adsorbed onto the four samples of Example 7 and resultant materials were labeled FBG-100824A, FBG-100824B, FBG-100824C and FBG-100824D, respectively. The procedure for the preparation of these samples is set forth above in Example 3. The properties for each of the samples is set forth in Table V below:

TABLE V

| | | Sample | | | |
|---|---|---|---|---|---|
| | | FBG 100824 A | FBG 100824 B | FBG 100824 C | FBG 100824 D |
| Alumina | | CO10118, 0.8 mm | CO10524, 0.8 mm | CO10593, 1 mm | CO10118, 1 mm |
| Calculated Content | ATMP | 17.7 | 38.5 | 40.5 | 26.2 |
| Determined Content | % by weight | 9.7 | 16.7 | 20.6 | 13.2 |
| Bulk Loose Density packed | lb/ft3 | 106 114 | 88 94 | 87 94 | 100 108 |
| Specific gravity | H2O = 1 | 3.19 | 2.94 | 2.87 | 3.11 |
| Moisture | % by weight | 0.41 | 0.50 | 0.51 | 0.48 |

Example 9

Figure 4A:
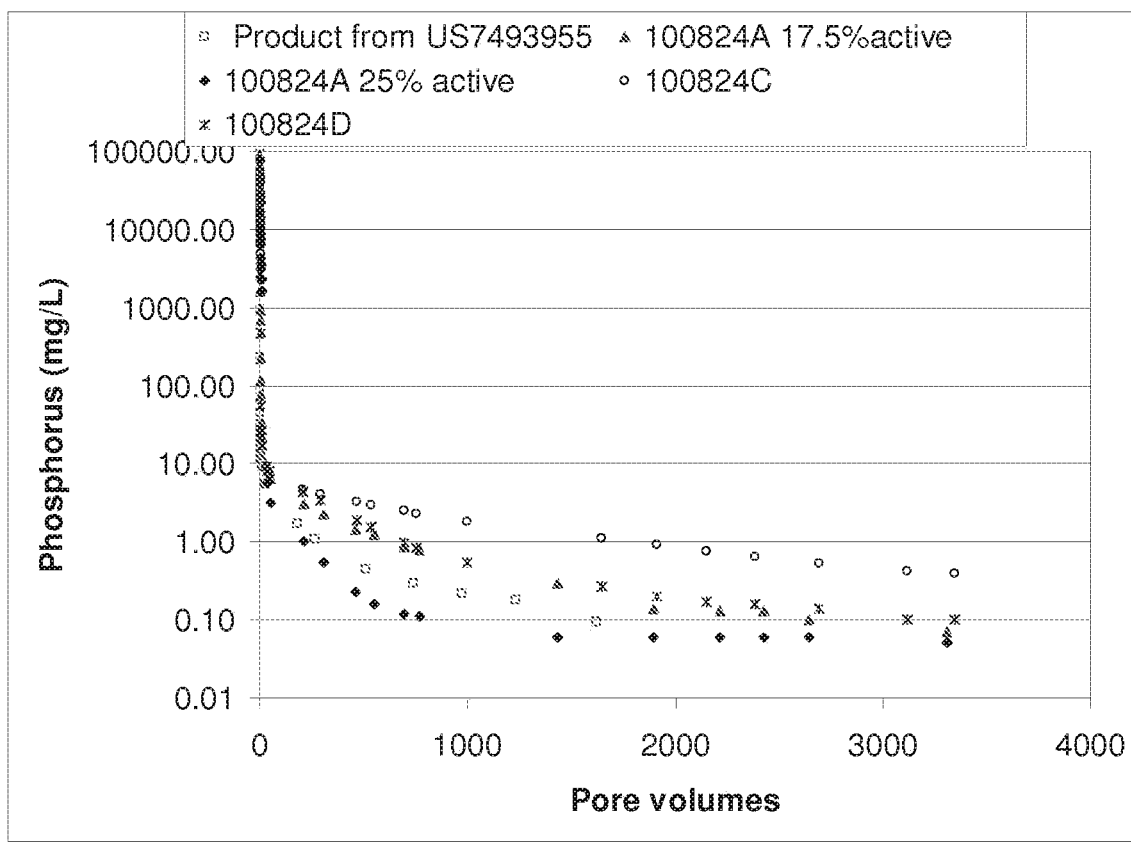
FIG. 4A and FIG. 4B are release profiles of a scale inhibitor in high strength composites containing porous alumina adsorbents of varying diameters and sizes between 0 to 4,000 pore volumes and 0 to 10,000 pore volumes, respectively.
Figure 4B:
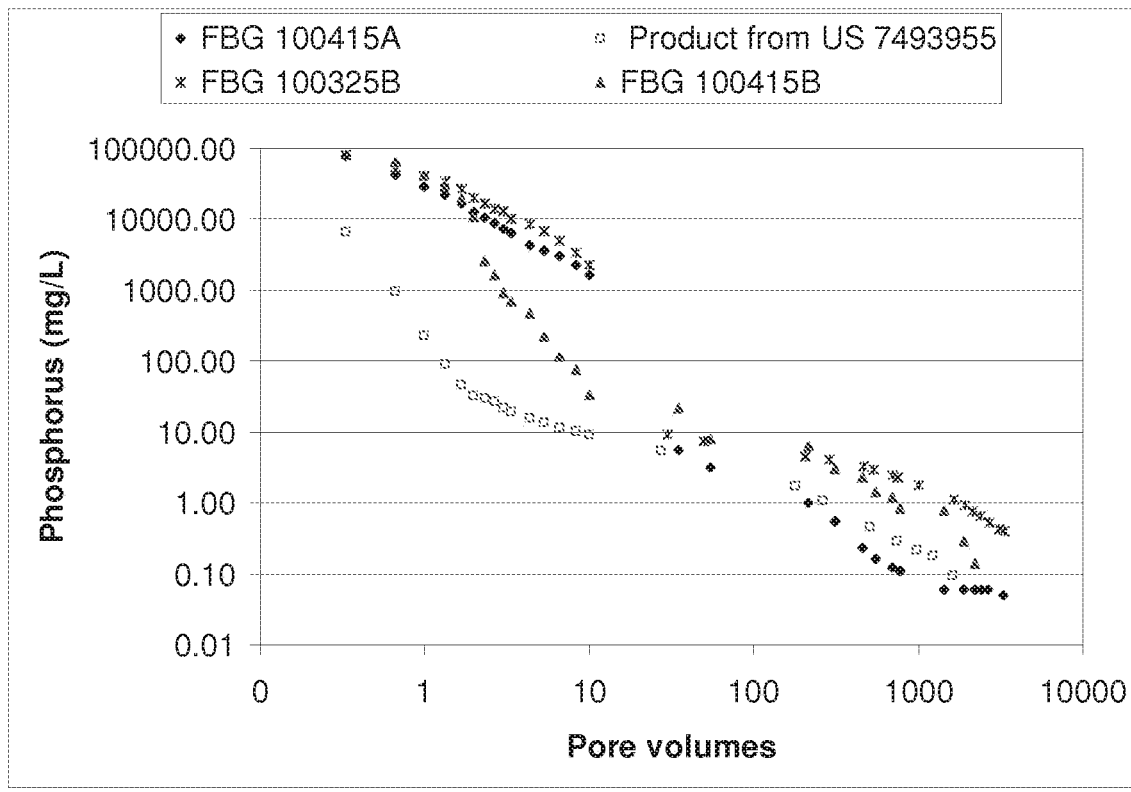

The elution of each of samples of Example 8 was performed in accordance with the procedures set forth in Examples 4 and 6 with 50% of the particles by weight of the sand in the column. The results are set forth in FIG. 4A and FIG. 4B and are compared to the results of 2% of loading of the composite exemplified in U.S. Pat. No. 7,493,955. The results are similar to those of Example 6 and show that the amount of composite may be tailored with the amount of proppant depending on the amount of water produced from the well and how long protection is desired. As illustrated, 2% of the particles in the sand and 50% particles in the sand may be used for the same purpose.

Example 10

About 800 g of 10/50 mesh diatomaceous earth (Celite MP-79) absorbent was added into a mixing bowl. A paddle mixer blade was attached and liquid organophosphate (Solutia Dequest 2000) was added to the mixing bowl at a rate in which the liquid was readily absorbed, and the liquid did not puddle. After all of the liquid was added, mixing was continued until a homogenous blend was produced. The blend was then dried at 225 F until the percent moisture of the resulting product was less than 3%. The composite thus prepared contained 25 percent by weight of organophosphate scale inhibitor. To the composite was then added a binder of an epoxy resin (A), phenolic resin (B) and polyvinyl alcohol (C). The mixture contained about 50 percent by weight of the resin. The mixture was then compressed under a pressure of about 250 psi for about 1 minute in a mold to render a cylindrical pellet resembling a hockey puck having a diameter of about 1 inch and a thickness of about 0.5 inch to render puck (A), (B) and (C) corresponding to the epoxy resin binder, phenolic resin binder and polyvinyl alcohol binder, respectively. Puck (D) was obtained by coating Puck (C) with an epoxy resin by spray and drying.

Example 11

Figure 5:
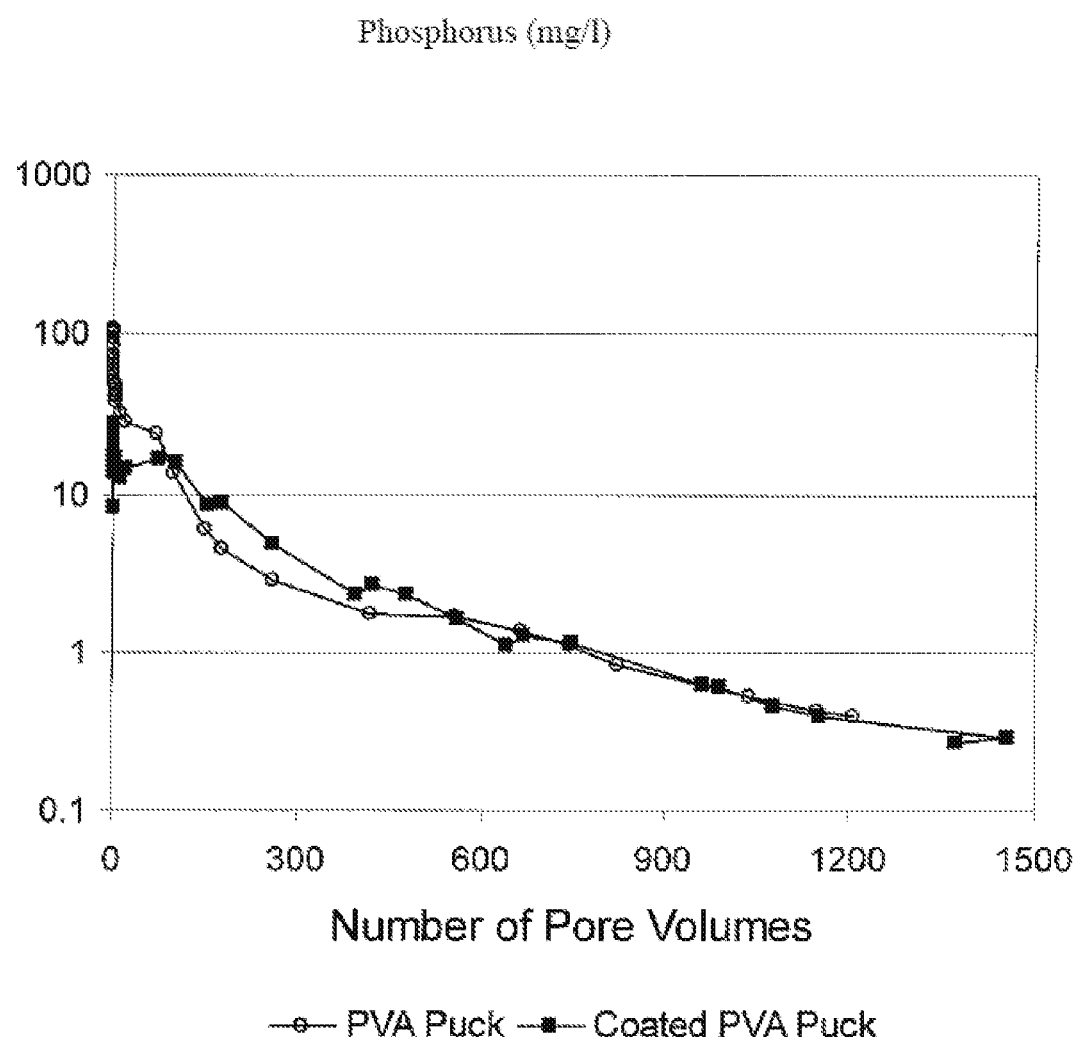
FIG. 5 illustrates the inhibitor return curve for a compressed pellet of a composite of scale inhibitor and adsorbent in a polyvinyl alcohol matrix [Puck (C)] and an epoxy matrix [Puck (D)].

The elution characteristics of Puck C and Puck D were then determined by packing approximately 440 grams 20/40 Ottawa white frac sand and 3 pieces of the pucks into a 30 cm length stainless steel column (ID=3.48 cm). The pore volume of the column was approximately 80 milliliters. The column was eluted with a synthetic brine (0.025 mol/L CaCl$_2$, 0.015 mol/L NaHCO$_3$, 1 mol/L NaCl, sparged with 100% CO$_2$) at 60° C. at a flow rate of 270 ml/hour. The effluent solution was collected and analyzed for phosphorus and calcium concentration to obtain the inhibitor flow back curve, set forth in FIG. 5. As illustrated in FIG. 5, the concentration of phosphorus in the effluent gradually decreased as synthetic brine was pumped into the column. After 1200 pore volumes of return flow, the concentration of effluent phosphorus remained approximately 0.4 ppm. There was no significant difference found between the phosphorus return curves of Puck (C) and Puck (D). The data demonstrates the ease that the pucks have while flowing through production tubing.

Example 12

Figure 6:
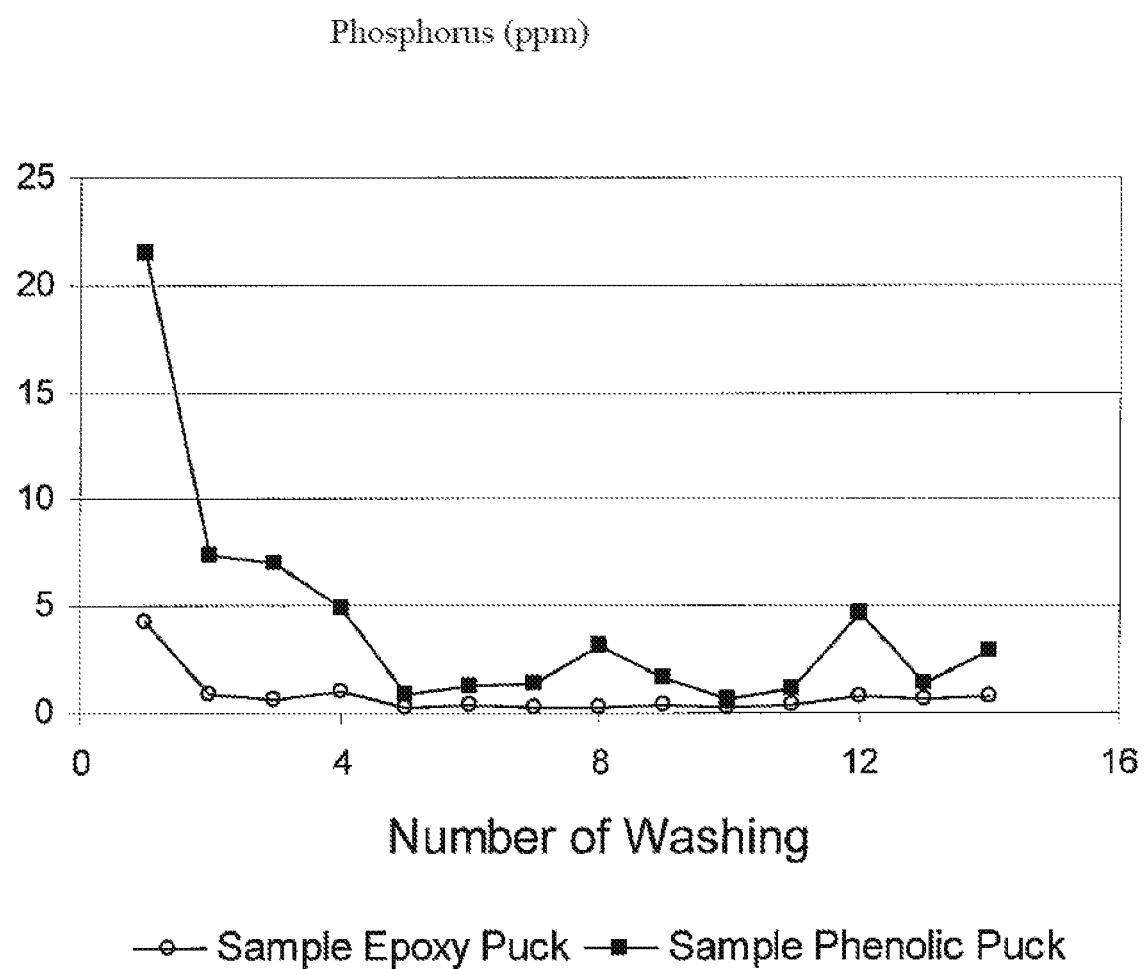
FIG. 6 illustrates the results of static breaker tests on a compressed pellet of a composite of scale inhibitor and adsorbent in an epoxy matrix [Puck (A)] and phenolic matrix [Puck (B)].

Puck (A) and Puck (B) were mixed with 500 ml of water. After 30 minutes, the supernatant was removed and the concentration of phosphorus in the supernatant was measured by (ICP) spectrophotometer. The test was repeated 14 times. The amount of residual phosphorous in the supernatant, illustrated as the static breaker test, is illustrated in FIG. 6. FIG. 6 demonstrates that the concentration of phosphorus in the effluent concentration of Puck (B) was higher than that of sample Puck (A) after washing with tap water.

Example 13

Figure 7:
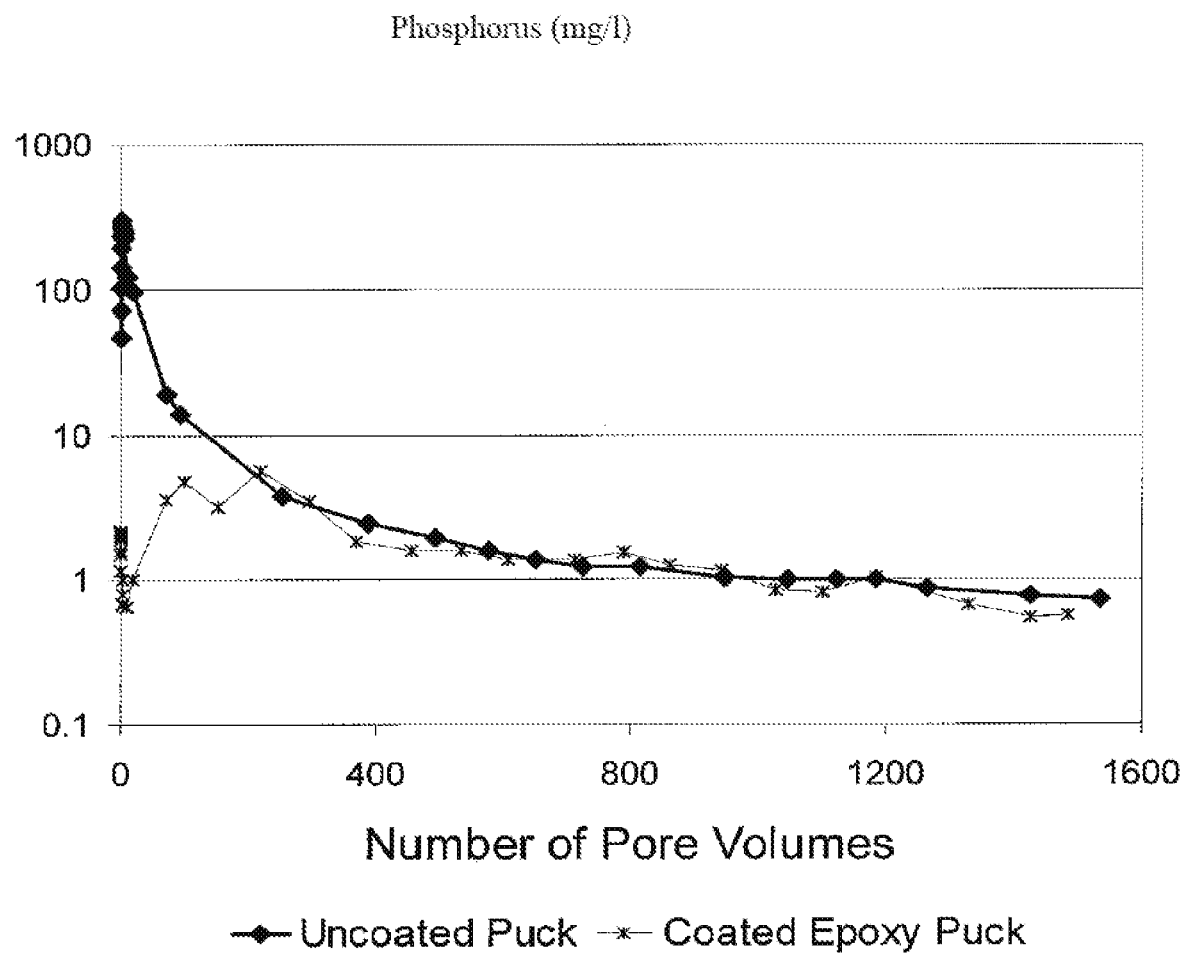
FIG. 7 illustrates the inhibitor return curve for a compressed pellet of a composite of scale inhibitor and adsorbent in a high melting polyethylene wax wherein only one of the pucks is coated with an epoxy resin.

To about 95% by weight of the composite of Example 5 was added about 5% by weight of a high melting polyethylene wax. The mixture was then compressed into a pellet having a diameter of 1 inch and about half inch in height to obtain Puck (E). Puck (F) was obtained by coating the compressed pellet of Puck (E) with about 20 weight % epoxy resin and drying the coated resin at 120° F. Puck (E) and Puck (F) were then immersed in water at 180° F. for five days. No deterioration was seen in either puck after 5 days. Puck (E) and Puck (F) were also immersed in W. Texas Crude Oil for two weeks at 140° F. No deterioration was seen in either puck after two weeks. Elution studies were then conducted on Puck (E) and Puck (F) in accordance with the testing conditions of Example 11. FIG. 7 represents the inhibitor flow back curve of Puck (E) and Puck (F). The results indicate the release of scale inhibitor above the minimum effective inhibitor concentration of 0.1 mg/l even after 1500 pore volumes of fluid elution through the column when the testing was terminated. The results of the release curve for the coated Puck (F) indicate no premature release of the inhibitor at the beginning which should result in longer effectiveness of the puck.

From the foregoing, it will be observed that numerous variations and modifications may be effected without departing from the true spirit and scope of the novel concepts of the disclosure.

What is claimed is:

1. A method of continuously releasing over time a well treatment agent into a well or to a subterranean formation penetrated by the well, the method comprising introducing into the well a screen assembly comprising an enclosed screen having openings and wherein a composite comprising a well treatment agent and a substrate is within the interior of the enclosed screen, wherein the well treatment agent is selected from the group consisting of scale inhibitors, corrosion inhibitors, paraffin inhibitors, salt formation inhibitors, asphaltene dispersants and mixtures thereof and the diameter of the openings of the enclosed screen is smaller than the diameter of the substrate and further wherein the well treatment agent is released from the substrate of the composite over time and then passes into the well or subterranean formation through openings of the screen.

2. The method of claim 1, wherein the screen assembly is introduced into the well after the subterranean formation has been stimulated.

3. The method of claim 2, wherein after stimulation the well is shut-in and during shut-in the screen assembly is situated in the well.

4. The method of claim 1, wherein the screen assembly is introduced into an open well.

5. The method of claim 1, wherein the well treatment agent is released into the well or subterranean formation over a period of time of at least six months.

6. The method of claim 1, wherein the amount of well treatment agent in the composite is between from about 0.05 to about 5 weight percent.

7. The method of claim 1, wherein the composite contains between from about 1 to about 50 weight percent of the well treatment agent.

8. A method of releasing a well treatment agent into reservoir fluids produced in a well penetrating a subterranean formation, the method comprising introducing into the well a screen assembly comprising an enclosed screen having openings and having within the interior of the enclosed screen a well treatment composite comprising a well treatment agent and a substrate wherein the well treatment agent is selected from the group consisting of scale inhibitors, corrosion inhibitors, paraffin inhibitors, salt formation inhibitors, asphaltene dispersants and mixtures thereof and the diameter of the opening in the sealed screen is less than the diameter of the substrate and continuously releasing the well treatment agent from the substrate of the composite while the composite is within the interior of the enclosed screen and further wherein the composite comprises:

(a) a well treatment agent adsorbed into the interstitial spaces of a calcined porous metal oxide;

(b) a well treatment agent adsorbed onto a water-insoluble adsorbent; or (c) a hydrocarbon soluble well treatment agent absorbed into the interstitial spaces of a porous particulate material.

9. The method of claim 8, wherein the well treatment composite, when introduced into the well in the screen assembly, is a compressed shaped article.

10. The method of claim 8, wherein the composite comprises the well treatment agent and a calcined porous metal oxide wherein the porosity and permeability of the calcined porous metal oxide is such that the well treatment agent is absorbed into the interstitial spaces of the porous metal oxide and further wherein (a) the surface area of the calcined porous metal oxide is between from about 1 $m^2/g$ to about 10 $m^2/g$; (b) the diameter of the calcined porous metal oxide is between from about 0.1 to about 3 mm; and (c) the pore volume of the calcined porous metal oxide is between from about 0.01 to about 0.10 g/cc.

11. The method of claim 10, wherein the porous metal oxide is alumina.

12. The method of claim 8, wherein the well treatment agent is immobilized on or within a porous particulate.

13. The method of claim 8, wherein the well treatment agent is adsorbed onto a water-insoluble adsorbent.

14. The method of claim 8, wherein the screen assembly is introduced into the well after the subterranean formation has been stimulated.

15. The method of claim 14, wherein after stimulation the well is shut-in and during shut-in the screen assembly is situated in the well.

16. The method of claim 8, wherein the screen assembly is introduced into an open well.

17. The method of claim 8, wherein the well treatment agent is released into the well or subterranean formation over a period of at least six months.

* * * * *